May 20, 1930.                J. C. MONTEITH                1,759,201
                       VEHICLE BUMPER CONSTRUCTION
                       Filed June 7, 1929        2 Sheets-Sheet 1
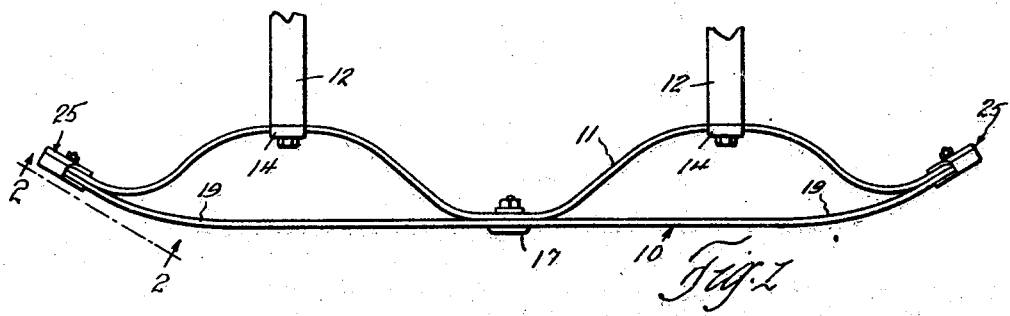
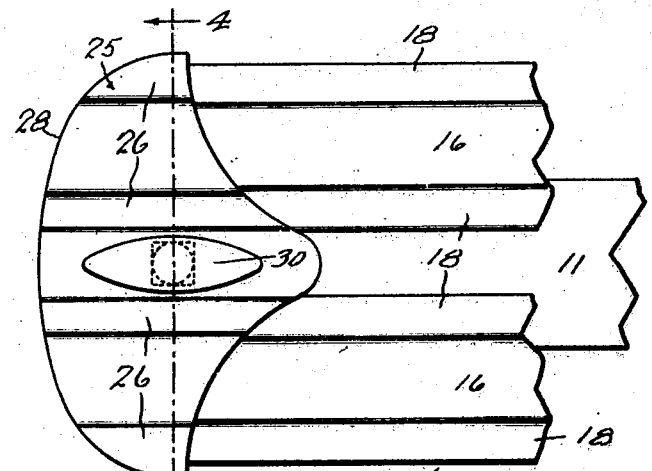
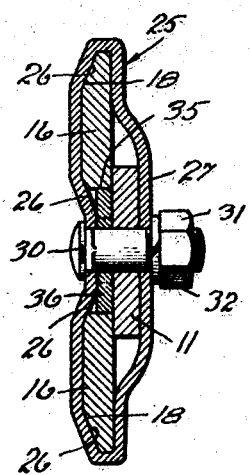
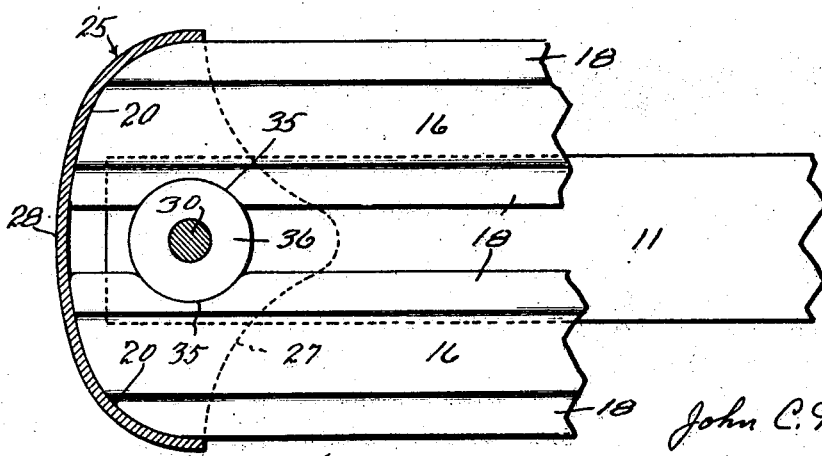
Inventor
John C. Monteith
By Hull Broch & West
Attorney May 20, 1930. J. C. MONTEITH 1,759,201
VEHICLE BUMPER CONSTRUCTION
Filed June 7, 1929 2 Sheets-Sheet 2
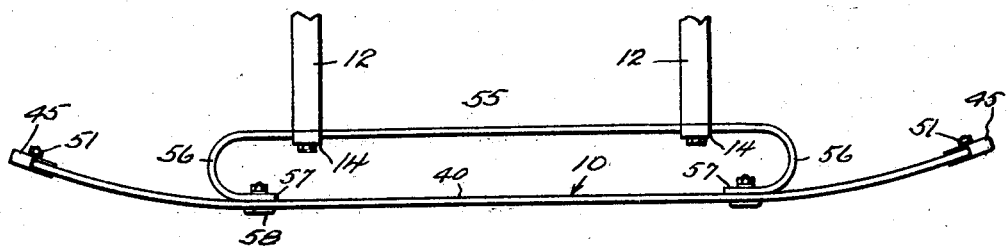
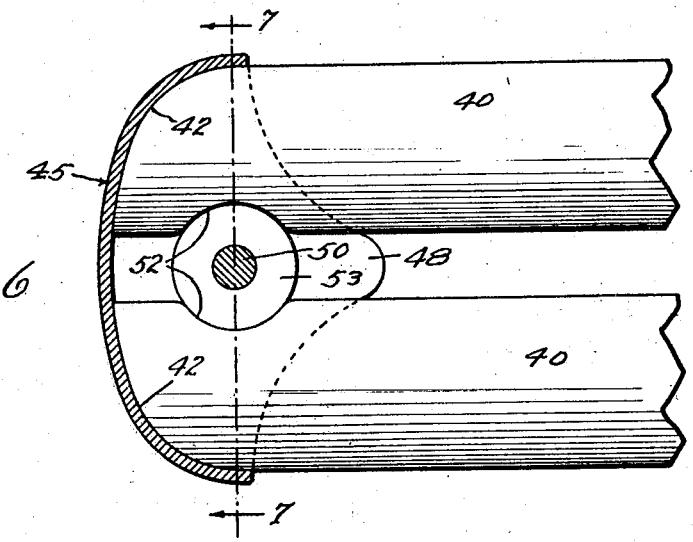
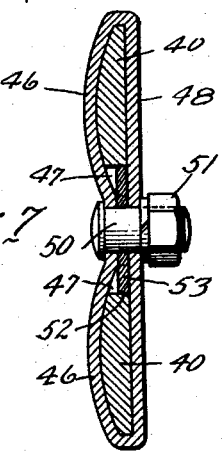
Inventor
John C. Monteith
By Hull, Brock & West
Attorney Patented May 20, 1930

1,759,201

UNITED STATES PATENT OFFICE

JOHN C. MONTEITH, OF CLEVELAND, OHIO, ASSIGNOR TO STERLING SPRING COMPANY, OF CLEVELAND, OHIO, A CORPORATION OF OHIO

VEHICLE BUMPER CONSTRUCTION

Application filed June 7, 1929. Serial No. 369,066.

This invention relates to a bumper for vehicles and more particularly to a novel end cap and clamp for the front bars of the bumper.

The object of the invention is to provide a bumper having vertically spaced front bars and a rear or supporting bar in which the ends of such bars are encased and securely clamped together in a cap or sleeve, all the bars being held in place by a single bolt, or in which the ends of the front bars only are encased and clamped by a single bolt.

A further object is to provide an end clamp or sleeve for bumpers in which the ends of the bumper bars are securely held, which is neat in appearance and which provides a relatively smooth rounded end for the bumper.

In the drawing which forms a part of this specification Fig. 1 is a top plan view of a bumper with the ends constructed in accordance with my invention; Fig. 2 is an enlarged fragmentary detail view of the end portion of the bumper taken on line 2—2 of Fig. 1; Fig. 3 is a vertical sectional view through the sleeve showing the method in which the bars are held therein; Fig. 4 is a sectional view through the bumper taken on line 4—4 of Fig. 2; Fig. 5 is a top plan view of a different form of bumper on which a slightly modified form of end sleeve is used; Fig. 6 is an enlarged fragmentary detail of the end of the bumper shown in Fig. 5, the sleeve being shown in section, and Fig. 7 is a sectional view taken on the line 7—7 of Fig. 6.

Referring to the drawings in which like reference numerals designate like parts in the several views, the bumper shown in Figs. 1 to 4 inclusive which embodies the end construction of my invention comprises an impact section designated generally by the reference numeral 10, and a back bar or anchor bar 11 by which the bumper is secured to the frame horns 12 of a vehicle in the usual manner by clamps 14.

The impact section 10 is made up of two vertically spaced bars 16 secured to each other and to the central portion of the back bar by means of a center clamp 17 of any desired construction. In the form illustrated in Figs. 1 to 4 inclusive the front bars 16 have their front edges beveled as at 18 and inwardly of their ends the bars are bowed as at 19 so that the ends project slightly toward the rear. The ends of the rear bar 11 are bent to extend parallel with the ends of the front bars and to contact with the rear faces thereof. The ends of the front bars 16, it will be noted, are rounded as at 20 and over the ends of the front and rear bars a sleeve or cap 25 fits.

The front face of the cap 25 is made to conform to the shape of the front sides of the bars 16 so that the inner tapered portions 26 of the wall provide seats for the bars 16 and hold them in spaced relation. The rear face of the cap is provided at its center with an outwardly bowed portion 27 providing a seat for the end of the rear bar 11. The cap 25 is so shaped and proportioned that the ends of the bars 16 and 11 when in close engagement fit snugly therein, and the outer end 28 of the cap is rounded to provide a smooth and neat end for the bumper.

The front and rear sides of the cap are provided centrally with aligned apertures to receive a clamping bolt 30 which passes through an aperture in the rear bar 11 and holds the parts in assembled relation. The metal from which the cap 25 is constructed is sufficiently flexible so that when the nut 31 on the bolt 30 is tightened the bars 16 and 11 are tightly clamped together and between the front and rear wall of the cap. To prevent longitudinal movement of the front bars in the cap, each bar 16 is provided near its end and on its inner edge with an arcuate or other shaped notch 35 opposite the bolt 30. In the recess provided by the opposed notches 35 a round or other shaped washer or filler member 36 fits, the washer being received on the bolt 30 and clamped in place between the front side of the cap and front side of the rear bar by the nut 31. A lock washer 32 may, of course, be used to prevent the nut from working loose on the bolt under the vibration of the vehicle on which the bumper is used.

The washer 36 is of such a thickness as to be clamped between the front side of the sleeve 25 and the back bar 11 when the nut 31 is drawn tight on the bolt 30 but is thin enough to allow the front side of the sleeve 25 to tightly clamp the front bars 16 before it is limited in its inward flexing by the washer 36.

In Figs. 5 to 7 inclusive a modified form of clamping sleeve is shown, which is used on the type of bumper where the back bar is not attached to the ends of the front bars.

In this form of bumper the impact section 10 is made up of two spaced bars 40 with rounded front faces. The two bars 40 have their ends rounded as at 42 and the ends of the bars are received in caps or sleeves 45 the front sides 46 of which are shaped to conform to the rounded face of the bars so as to provide sockets 47. The back side 48 of each sleeve is straight. A bolt 50 passes through the central portion of the sleeve between the bars 11 so that when the nut 51 is tightened the bars are clamped tightly between the front and back sides of the sleeve. Each bar 40 is notched as at 52 and in the opposed notches 52 is received a filler member 53 through which the bolt 50 passes, which filler member prevents longitudinal movement of the cap on the bars as long as the bolt 50 is in place. In this form the sleeve is sufficiently flexible to permit the sides to be clamped tightly on the bars 40 by the bolt and nut.

The back bar 55 in this form of bumper is secured intermediate of its ends to the frame horns 12 of the vehicle by clamps 14, and the ends of the bar are bent toward each other providing U-shaped resilient attaching portions 56. To the free ends 57 of the bar 55 the impact section 10 of the bumper is secured by suitable clamps 58. In this type of bumper the ends of the impact section 10 project outwardly beyond the back bar.

It is of course obvious that the back bar of the bumper may be of any shape or form to meet the requirements of the car upon which it is to be attached, and the impact section may be made of more than the two bars without departing from the spirit of my invention and the scope of the appended claims.

The cap either in the form shown in Figs. 1 to 4 or in the form shown in Figs. 5 to 7 with the one bolt and filler member provides a rigid connection for the ends of the bumper bars as well as a smooth, neat end for the completed bumper.

Having thus described my invention, what I claim is:

1. A bumper comprising vertically spaced front bars and a back bar, said bars at one end being arranged parallel with each other and the back bar contacting with the front bars, a cap member fitting over the ends of said bars and a single bolt rigidly securing the bars in said cap and to each other.

2. In a bumper having vertically spaced front bars and a back bar, the ends of said back bar contacting with the rear face of said front bars, a single piece cap member fitting over the ends of said bars, a bolt passing through the cap member and the back bar, and cooperating means on said spaced front bars and on said bolt for preventing lengthwise movement of the front bars in the cap.

3. In a bumper having vertically spaced front bars and a back bar, the ends of said back bar contacting with the rear face of said front bars, a single piece cap member fitting over the ends of said bars, said cap having its front wall formed with seats in which the front bars fit for holding the bars in spaced relation, a bolt passing through the cap member and the back bar, and cooperating means on said spaced front bars and on said bolt for preventing lengthwise movement of the front bars in the cap.

4. A bumper for vehicles having two or more front bars, the ends of which are in vertically spaced relation, a back bar and a sleeve receiving the corresponding ends of said front and back bars, means passing through said sleeve and one of said bars for clamping all of the bars in said sleeve, and cooperating means on the other bars and said first mentioned means for preventing endwise movement of the bars in said sleeve.

5. A bumper for vehicles having two vertically spaced front bars and a back bar, the end of the back bar contacting with the rear faces of said front bars, a sleeve provided on its inner surfaces with seats receiving and properly positioning the ends of said bars, bolt means passing through said sleeve and back bar and between the front bars securely clamping the bars in said sleeve, and means on said bolt means engaging said front bars to prevent endwise movement thereof in said sleeve.

6. A bumper for vehicles having two vertically spaced front bars and a back bar, the end of the back bar contacting with the rear faces of said front bars, a sleeve provided on its inner surfaces with seats receiving and properly positioning the ends of said bars, bolt means passing through said sleeve and back bar and between the front bars securely clamping the bars in said sleeve, said front bars having opposed notches on their inner edges arranged on opposite sides of said bolt, and a washer member on said bolt means and received in said notches, whereby when the bolt means is tightened the front bars are held against longitudinal movement in said sleeve member.

7. In a bumper for vehicles having front and back bars, a single piece sleeve member receiving the corresponding ends of said bars, and a single bolt passing through said sleeve for securely clamping each of said bars therein, there being means on said bolt engaging each bar to prevent relative endwise movement of the bars in said sleeve.

8. In a bumper having a plurality of vertically spaced front bars, a single piece cap member fitting over the ends of said bars, a bolt member passing through said cap member between adjacent bars, said bars having notches on their edges at opposite sides of said bolt member, a filler block on said bolt and fitting in said notches, whereby the cap is held from endwise movement on said bars.

9. In a bumper having an impact section made up of a plurality of bars the ends of which are spaced from each other, a cap member for holding said bars together in spaced relation fitting over the corresponding ends of said bars, and bolt means passing through said cap between said bars for clamping the parts together, and interengaging means on said bolt and bars for preventing endwise movement of said cap on said bars.

10. In a bumper having an impact section made up of a plurality of bars spaced vertically at their ends, and arranged in edge to edge relation to each other, a cap member fitting over corresponding ends of said bars, and a bolt member passing through the cap between said bars, notches on said bars and means on said bolt engaging in said notches for locking the cap against longitudinal movement.

In testimony whereof, I hereunto affix my signature.

JOHN C. MONTEITH.